UNITED STATES PATENT OFFICE.

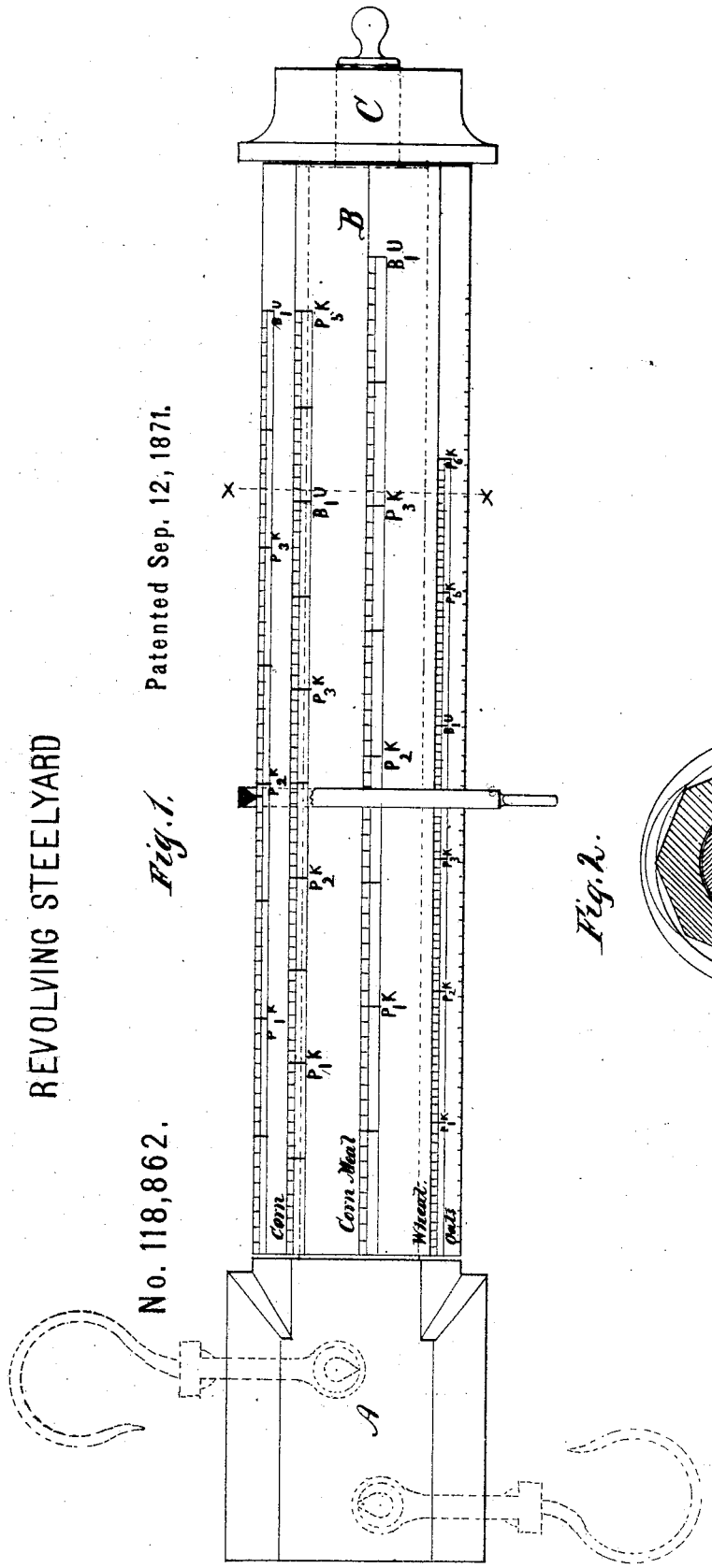
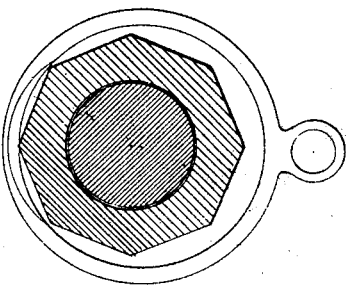

HENRY KIRKWOOD, OF AMERICUS, MISSISSIPPI, ASSIGNOR TO ALEXANDER KIRKWOOD, OF SAME PLACE.

IMPROVEMENT IN REVOLVING STEELYARD-BEAMS.

Specification forming part of Letters Patent No. 118,862, dated September 12, 1871.

*To all whom it may concern:*

Be it known that I, HENRY KIRKWOOD, of Americus, in the county of Jackson and State of Mississippi, have invented certain Improvements in Steelyard-Beams, of which the following is a specification:

My invention relates to steelyard-beams for weighing different kinds of articles, dry or liquids, each by their own separate measures, not only the weight by pounds, but also their bulk measure, whether dry or liquid, can be determined without calculation; and to this end my invention consists in providing such steelyard-beams with removable cylinders, so that the dry-measure scale may be removed and substituted by the liquid-measure scale, each beam being provided with a suitable number of such detachable scales, and being constructed so that the same can be exchanged with very little trouble.

In the drawing, Figure 1 is a side elevation of my improvement in steelyard-beams. Fig. 2 is a cross-section of the same.

A is the steelyard-beam, which is constructed cylindrical, so that a cylinder, B, may revolve around it freely as an axis. One end of the beam A may be made square and provided with the usual hooks for its attachment in a suitable place, and to hold the article to be weighed, while its other end is provided with a smaller portion upon which a nut, C, is screwed, which holds the cylinder B firmly in position when desired, by frictional contact, in such a manner that a slight turn of the nut to either side will cause the cylinder B either to be held firmly on the beam or to revolve freely on the same. This cylinder is divided lengthwise into any suitable number of surfaces, each one of which is divided up into separate and distinct scales for different kinds of articles, one cylinder being, by preference, devoted to dry and a separate cylinder for liquid measures. These scales indicate the bulk-measure of the article, which, according to the proper rules, are again subdivided into weight-measure, so that in weighing any article on its own scale, the steelyard-beam scale will at once indicate, not only the measure by bushel, peck, gallon, quart, or pint, but also in pounds and ounces, thus obviating the necessity of reducing bulk-measure and its fractions into weight-measure and its fractions, or vice versa. It is impracticable to have too many scales on one cylinder, as it only serves to confuse the person weighing. For this reason I so construct my steelyard-beam that several cylinders may be used, they being readily detachable from the beam, and yet firmly held in position by means of the nut C.

I am well aware that Hiram S. Cushing obtained Letters Patent for a revolving-cylinder on steelyard-beams May 8th, 1866; and I do not, therefore, claim this feature. But my cylinders are readily removable, so as to be exchanged, one for another, without trouble, and my beam may be used for buying as well as selling, while Cushing's can only be used for selling, as the change of price also indicates a corresponding change of measure, while in my improvement only the measure is changed; and in using Cushing's beam the calculation of fractions has to be made, anyhow, by mental process.

Having described my invention, I claim—

The combination of the steelyard-beam A with the detachable cylinder B and the nut C, all arranged to operate with suitable weight, substantially as herein specified.

HENRY KIRKWOOD.

Witnesses:
W. W. COWART,
A. KIRKWOOD.